(12) United States Patent
Ndzebet

(10) Patent No.: US 6,780,347 B2
(45) Date of Patent: Aug. 24, 2004

(54) MANGANESE OXIDE BASED ELECTRODE FOR ALKALINE ELECTROCHEMICAL SYSTEM AND METHOD OF ITS PRODUCTION

(75) Inventor: Ernest Ndzebet, Middleton, WI (US)

(73) Assignee: Rayovac Corporation, Madison, WI (US)

( * ) Notice: Subject to any disclaimer, the term of this patent is extended or adjusted under 35 U.S.C. 154(b) by 343 days.

(21) Appl. No.: 10/066,938

(22) Filed: Feb. 4, 2002

(65) Prior Publication Data

US 2003/0146414 A1 Aug. 7, 2003

(51) Int. Cl.[7] .............. H01B 1/04; H01M 4/88; C01B 35/08; C01G 45/02
(52) U.S. Cl. .............. 252/500; 252/502; 252/518.1; 429/224; 429/218; 423/599; 516/19; 502/324
(58) Field of Search ............ 252/500, 502, 252/518.1; 429/224, 218; 423/599, 49, 50; 524/430; 502/324; 516/19

(56) References Cited

U.S. PATENT DOCUMENTS

| | | | |
|---|---|---|---|
| 3,948,684 A | | 4/1976 | Armstrong |
| 4,433,035 A | | 2/1984 | Wiacek |
| 5,268,408 A | * | 12/1993 | Milner .............. 524/413 |
| 5,298,343 A | | 3/1994 | Savadogo et al. |
| 5,308,711 A | | 5/1994 | Passaniti et al. |
| 5,378,562 A | * | 1/1995 | Passaniti et al. ............ 429/224 |
| 5,604,057 A | | 2/1997 | Nazri |
| 5,674,644 A | * | 10/1997 | Nazri .............. 429/224 |
| 5,721,065 A | | 2/1998 | Collien et al. |
| 6,284,410 B1 | | 9/2001 | Durkot et al. |
| 6,444,609 B1 | * | 9/2002 | Golovin .............. 502/324 |
| 6,465,129 B1 | * | 10/2002 | Xu et al. .............. 429/224 |
| 6,632,557 B1 | * | 10/2003 | Curelop et al. .............. 429/42 |

FOREIGN PATENT DOCUMENTS

| | | | |
|---|---|---|---|
| FR | 2659075 | | 3/1990 |
| GB | 609216 | * | 9/1948 .............. B01J/1/13 |
| JP | 2000-211923 | * | 8/2000 .............. C01G/45/02 |
| WO | WO 01/37358 | | 5/2001 |

* cited by examiner

Primary Examiner—Mark Kopec
Assistant Examiner—Kallambella Vijayakumar
(74) Attorney, Agent, or Firm—Quarles & Brady LLP (57) ABSTRACT

A method is disclosed for preparing cathodes loaded with manganese oxide that are suitable for use in metal-air cells. The manganese oxide is prepared from the reduction of potassium permanganate by sodium formate at a substantially neutral pH level to produce manganese oxide sols. The sols are then mixed with a carbon slurry to produce a colloidal suspension. The suspension is subsequently waterproofed before being filtered, washed, dried, and rolled to produce the active catalyst layer for the cathode during discharge of the cell. The catalyst layer is then laminated with a current collector and air diffusion layer. A separator is then added to provide a carbon-based air cathode loaded with manganese oxide.

18 Claims, 7 Drawing Sheets

Flow-sheet for fabrication of carbon based air cathode

Fig. 3: Performance of carbon based ir cathode loaded with or without manganese oxide Fig. 4: Performance of new invention based air cathode VS present art Fig. 5: Particle size distribution of manganese oxide of this invention Fig. 6: Long-term stability performance at constant current density of new invention carbon based air cathode Vs present art Fig. 7: Discharge profile at 374 Ohm of 13U zinc air cells built with new invention based air cathode ; Test description.: 374 Ohm; 16H/D 70F/50%

MANGANESE OXIDE BASED ELECTRODE FOR ALKALINE ELECTROCHEMICAL SYSTEM AND METHOD OF ITS PRODUCTION

BACKGROUND OF THE INVENTION

The present invention relates generally to the fabrication of carbon-based air cathodes loaded with manganese oxide for metal air cells, and in particular, relates to the preparation of manganese oxide for such cathodes using a sol process.

Metal-air batteries produce electricity by electrochemically coupling in a cell a reactive metallic anode to an air cathode through a suitable electrolyte. As is well known in the art, an air cathode is typically a sheet like member having opposite surfaces that are exposed to the atmosphere and to an aqueous electrolyte of the cell. During operation, oxygen from air dissociates at the cathode while metal of the anode oxidizes, thereby providing a usable electric current flow through the external circuit between the anode and the cathode.

As the air cathode is extremely compact yet has essentially unlimited capacity, very high energy densities are achieved, resulting from the high volume available for the anode active material. For this reason, a metal-air cell can provide more watt-hours of electromotive force than a so-called "two-electrode cell" of similar cell size, mass and anode composition that contains both anode- and cathode-active materials inside the cell structure. Of the potential metal-air battery candidates, zinc has received the most attention because it is the most electropositive metal, which is relatively stable in aqueous and alkaline electrolytes without significant corrosion. In a zinc-air battery, the anode contains zinc and, during discharge, oxygen from the ambient air and water from the electrolyte is converted at the cathode to hydroxide, the zinc is oxidized at the anode by the hydroxide, and water and electrons are released to provide electrical energy.

Metal-air batteries such as zinc air are usually disk-like in appearance and are therfore referred to commonly as button or coin cells. These batteries are ideal power sources for small electronic devices such as hearing aids, and are disclosed in U.S. Pat. No. 5,721,065 issued Feb. 24, 1998, assigned to Rayovac Corporation, and entitled "Low Mercury, High Discharge Rate Electrochemical Cell" the disclosure of which is hereby incorporated by reference as if set forth in its entirety herein.

The increase in power consumption of the latest models hearing aids, such as digital hearing aids, has increased demand for high power cells. The power output of zinc air cells is mainly limited by the high polarization of air cathode that is ascribed to a slow catalytic reduction of oxygen. The air cathode used in electrochemical systems such as zinc air cells is designed to optimize the contact between the reactant and the electrolyte to maximize the reaction rate. Catalysts are commonly incorporated into air cathode structure to increase the rate of oxygen reduction. There have been many attempts over the years to find inexpensive highly active catalysts and a process for making them. However, the choice of materials is severely limited since any catalyst developed for this purpose must not only have a high activity towards oxygen reduction, but must be able to withstand a corrosive environment that would be encountered in an electrochemical cell.

Conventionally, the air cathodes used in electrochemical systems comprise many components and are typically made up of one, two or even more layers of these components. Typically, air cathodes contain an admixture of carbon, one or more catalysts, and polytetrafluorethylene (PTFE). Such a carbon-based admixture known as active layer are supported by a current collecting substrate, which usually consists of a cross-bonded screen having nickel metal strands woven therein, or a fine-mesh expanded metal screen. Finally an air diffusion layer, which usually consists of one or more pure PTFE membranes is laminated to the active layer to form a carbon-based air cathode.

It has been discovered that manganese oxide material provides a suitable catalyst for carbon-based air cathodes. For example, U.S. Pat. No. 4,433,035 entitled "Catalytic Cathode Composition for Air-Depolarized Cell and Method of Preparation" and U.S. Pat. No. 5,378,562 entitled "Method of Making Air Cathode Material Having Catalytically Active Manganese Compounds of Valance State+2" both disclose carbon based air cathodes loaded with manganese oxide through the reduction of potassium permanganate with either carbon black or activated carbon. Similarly, patent publication WO01/37358A2, entitled "Cathodes for Metal Air Electrochemical Cells" discloses an admixture of silver permanganate and carbon black, wherein silver permanganate is reduced in-situ by carbon black to form a manganese oxide/silver catalyst mixture supported on carbon, which is used as cathode for oxygen reduction. However, the reaction of carbon with an oxidizing agent such as potassium permanganate predominantly results in the formation of surface oxygen compounds that make the carbon materials more hydrophilic. During operation, an active layer that is too hydrophilic might become flooded and therefore restrict gas access. Consequently, increasing the hydrophilicity of active layer might therefore decrease electrode performance. Also, such surface oxygen compounds have effects on the electrical conductivity and chemical reactivity of carbon materials used as catalyst support French patent 2,659,075 entitled "sol-gel process for the preparation of manganese oxide" discloses the fabrication of manganese oxide via the reduction of potassium permanganate solution with a carboxylic acid having four carbon atoms. This method produces a manganese (IV) oxide gel with fumaric acid used as the reducing agent. It has been determined that the four-carbon nature of the reducing agent yields a gel, in which the manganese oxide particles are flocculated. Furthermore, this patent does not disclose a method of preparing manganese oxide particles that are suspended in solution and suitable to combine with carbon slurry to form the supported catalyst.

From a processing and performance standpoint, it would be desirable to preserve the surface chemistry that influences the physico-chemical properties such as wettability and electrical properties of carbon materials. What is therefore needed is a more reliable process of fabricating a low polarization carbon-based air cathode loaded with manganese oxide to raise the operating voltage of metal-air cells.

BRIEF SUMMARY OF THE INVENTION

In accordance with one aspect of the invention, a method is provided for producing a cathode mixture having manganese oxide particles. The method includes the steps of providing a first chemical compound having manganese, providing an organic reducing agent having one carbon atom, mixing the first chemical compound with the reducing agent to yield a manganese oxide compound, and adding the manganese oxide compound to a carbon slurry to produce a suspension of carbon slurry with suspended manganese oxide particles.

These and other aspects of the invention are not intended to define the scope of the invention for which purpose claims are provided. In the following description, reference is made to the accompanying drawings which form a part hereof, and which there is shown by way of illustration, and not limitation, preferred embodiments of the invention. Such embodiments do not define the scope of the invention and reference must therefore be made to the claims for this purpose.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
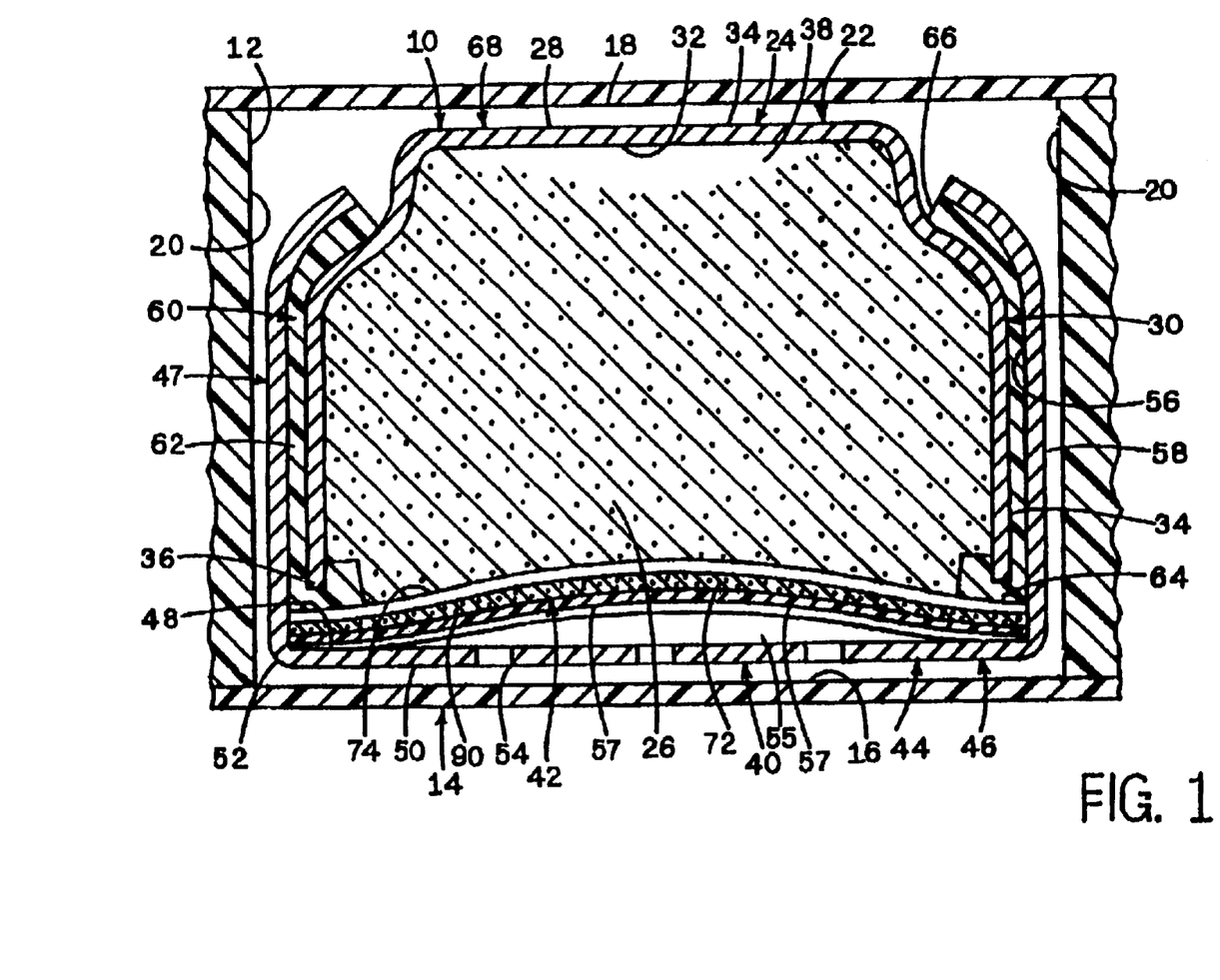
FIG. 1 is a schematic sectional side elevation view of a zinc-air button cell constructed in accordance with the preferred embodiment of the present invention.

Referring to FIG. 1, a metal-air cell, and in particular a button cell 10, is disposed in a battery cavity 12 of an appliance 14. The cavity 12 is generally bounded by a bottom wall 16, a top wall 18, and side walls 20.

The negative electrode of the cell 10, commonly referred to as the anode 22, includes an anode can 24 that contains anode active material 26. The anode can 24 has a top wall 28 and an annular downwardly-depending side wall 30. Top wall 28 and side wall 30 have, in combination, an inner surface 32 and outer surface 34. Side wall 30 terminates in an annular can foot 36, and defines a cavity 38 within the anode can, which contains the anode material 26.

The positive electrode, commonly referred to as the cathode 40, includes a cathode assembly 42 contained within a cathode can 44. Cathode can 44 has a bottom 46 and an annular upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can to provide avenues for air to flow into the cathode. An air reservoir 55 spaces the cathode assembly 42 from the bottom 46 and the corresponding air ports 54. A porous diffusion layer 57 fills the air reservoir 55, and presents an outer reaction surface 90 for the oxygen.

Side wall 47 of the cathode can has an inner surface 56 and an outer surface 58. It should be appreciated that an air mover (not shown) could be installed to assist in air circulation.

The cathode assembly 42 includes an active layer 72 that is interposed between a barrier layer 74 and air diffusion layer 57. Active layer 72 facilitates the reaction between the hydroxyl in the electrolyte and the cathodic oxygen of the air. Barrier layer 74 is a micro-porous plastic membrane, typically polypropylene, having the primary function of preventing anodic zinc particles from coming into physical contact with the remaining elements of the cathode assembly 42. Barrier layer 74 however, does permit passage of hydroxyl ions and water therethrough to the cathode assembly.

The anode 22 is electrically insulated from the cathode 40 via a seal, that includes an annular side wall 62 disposed between the upstanding side wall 47 of the cathode can and the downwardly-depending side wall 30 of the anode can. A seal foot 64 is disposed generally between the can foot 36 of the anode can and the cathode assembly 42. A seal top 66 is positioned at the locus where the side wall 62 of seal 60 extends from between the side walls 30 and 47 adjacent the top of the cell.

The outer surface 68 of the cell 10 is thus defined by portions of the outer surface 34 of the top of the anode can, outer surface 58 of the side wall 47 of the cathode can, outer surface 50 of the bottom of the cathode can, and the top 66 of seal 60.

In accordance with the preferred embodiment, the cathode 16 is loaded with manganese oxide to achieve higher operating voltages than prior art cathodes, and furthermore to improve long-term performance of the cathode during operation. In particular, a slurry containing manganese oxide particles is prepared via a sol process, and is then treated and laminated to provide a cathode containing manganese oxide particles, as will now be described.

Figure 2:
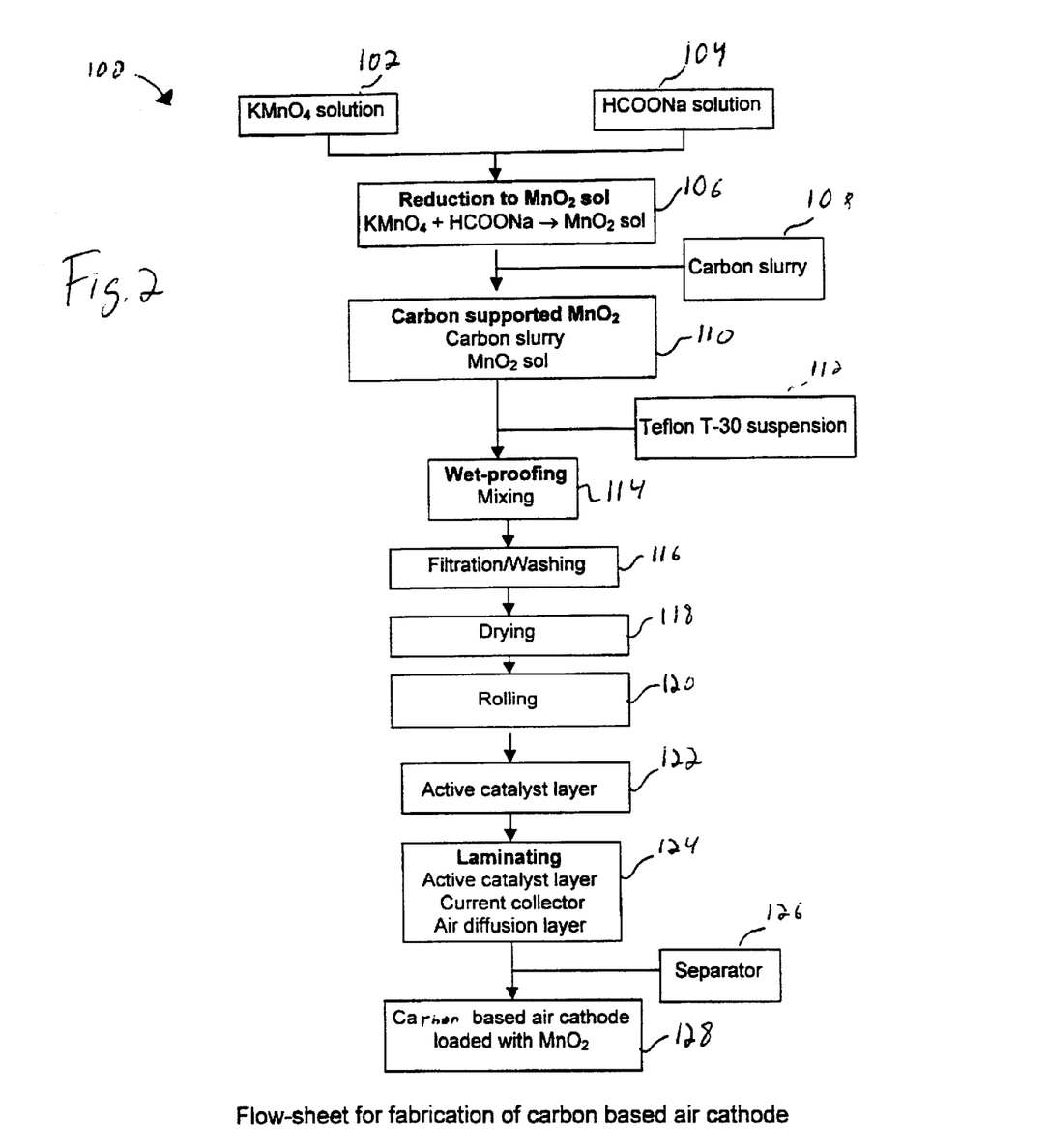
FIG. 2 is a flow chart illustrating the steps performed to fabricate a carbon-based air cathode in accordance with the preferred embodiment of the present invention.

In particular, referring to FIG. 2, a process 100 for fabricating a carbon-based air cathode in accordance with the preferred embodiment begins at steps 102 and 104 by providing a solution of potassium permanganate and sodium formate which are combined at room temperature at step 106 to produce manganese oxide sols according to the following reaction.

$$4KMnO_4 + 6HCOONa \rightarrow 4MnO_2 + 3CO_2 + 3H_2O + 2K_2CO_3 + 3Na_2CO_3 \quad (1)$$

Notably, the reaction in accordance with the preferred embodiment includes the organic sodium formate reducing agent that has one carbon atom and a neutral pH. The manganese oxide sols may be prepared from the reduction of potassium permanganate solution by sodium formate in acidic or alkaline solutions. It should be appreciated, however, that other reducing agents could be used, for example formic acid or formaldehyde.

As used herein, the term "neutral pH" is intended to include any pH level between 6 and 8, and approximately 7 in accordance with the preferred embodiment. Conventional reduction reactions produce cathodes having manganese oxide particles using either an inorganic reducing agent, or an organic reducing agent that has four carbon atoms.

As will become more apparent from the description below, the reduction of potassium permanganate by sodium formate reaction at step 46 produces a sol of manganese oxide particles that, when mixed with the carbon slurry, are distributed more homogeneously than in the manganese oxide particle-containing gel created in prior art techniques. Not intending to be limited to the theory of the invention, it has been determined that the improved distribution of manganese oxide particles may be attributed to the nature of the organic reducing agent having one carbon atom in contrast to conventional organic reducing agents that have four carbon atoms. It should be appreciated that the term "manganese oxide particles" is used in accordance with the present invention to include any compound containing manganese and oxygen, including manganese dioxide in accordance with the preferred embodiment.

Figure 5:
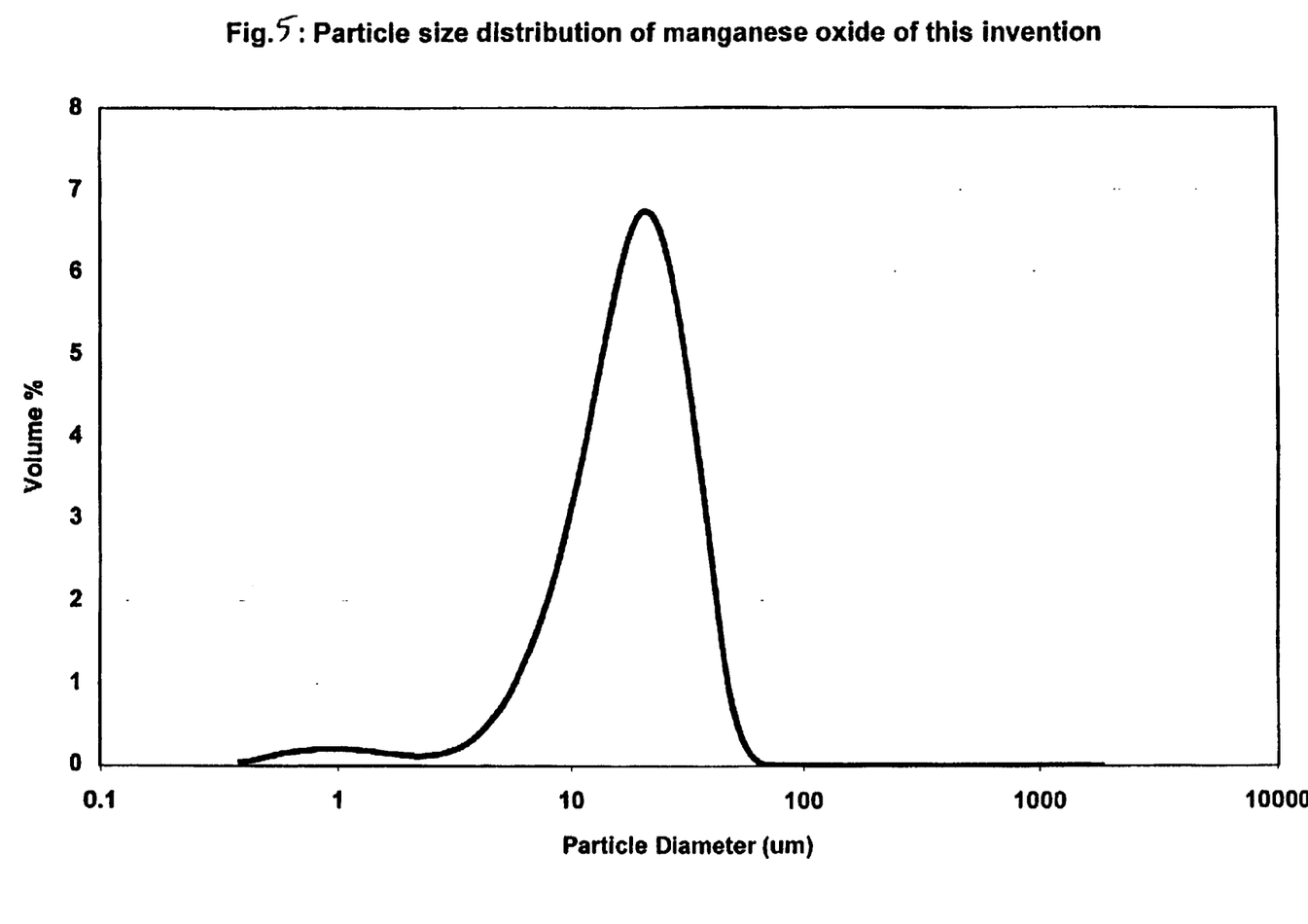
FIG. 5 is a graph illustrating the particle size distribution of manganese oxide in accordance with the preferred embodiment.

In accordance with the preferred embodiment, the manganese oxide particles have a particle size between 20 to 26 micrometers that are suspended in solution, though it should be appreciated that the present invention is intended to include sols of different sizes. The particle size distribution of manganese oxide produced in accordance with the preferred embodiment was determined using a Coulter Particle Size Analyzer, and is illustrated in FIG. 5. Next, at step 108, a carbon slurry is provided that comprises a mixture of activated carbon and carbon black having a BET surface area of approximately 900 $m^2/g$ and 1500 $m^2/g$, respectively. The preferred activated carbon in accordance with the preferred embodiment comprises Norit S1XG, manufactured by and commercially available from Norit Americas Inc, located in Atlanta, Ga. The preferred carbon black used in accordance with the preferred embodiment comprises Black Pearls 2000, manufactured by and commercially available from Cabot Corporation, located in Billerich, Mass.

Next, at step 110, the manganese oxide sols are poured into a tank containing the carbon slurry that was prepared at step 108, and the suspension is stirred to improve the dispersion of manganese oxide particles into the carbon matrix. If desired, the suspension of carbon slurry and manganese oxide sols may be heated until boiling. A colloidal suspension of manganese oxide in the carbon slurry is thus produced, at which point a waterproofing agent is added to the suspension at step 112, and the resulting mixture is stirred for approximately 10 minutes at step 114 prior to filtering and washing. In accordance with the preferred embodiment, 25 grams of Teflon T-30 suspension are added to the suspension at step 112, though other waterproofing agents could be used, such as polyethylene.

The mixture is filtered and rinsed with $H_2O$ at step 116 to remove any soluble impurities before being dried at step 118. In particular, the mixture is dried at 90° C. for approximately 14 hours in accordance with the preferred embodiment. Finally, it is rolled at step 120 to provide an active catalyst layer for the resulting air cathode at step 122. The catalyst layer is then laminated at step 124 with a nickel screen current collector at its inner surface and a PTFE layer at its outer surface to provide an air diffusion layer. In order to prevent electrical contact between the air cathode and anode, a separator is applied on the inner surface of the nickel screen at step 126. The separator may comprise a traditional non-woven fabric, or could alternatively comprise a conformal separator, as is understood by one having ordinary skill in the art.

Fabrication process 100 is completed at step 128 to produce a carbon-based air cathode loaded with substantially evenly distributed manganese dioxide particles that provide a catalyst to the oxygen reduction reaction that occurs during discharge of the cell. The cathode may then be installed into a metal-air cell in the conventional manner. While the preferred embodiment has been described in combination with a cathode for a button cell, it should be appreciated by a skilled artisan that the present invention is equally applicable to the fabrication of cathodes for other types of cells, including but not limited to other types of metal-air cells, fuel cells, or any other electrochemical cells that could benefit by having a manganese oxide-based electrode.

EXAMPLE

A solution of sodium formate was prepared in accordance with the preferred embodiment by first placing 180 grams of distilled water in a tank, and adding 20 grams of sodium formate powder. The mixture was stirred for approximately five minutes. Next, 350 ml of potassium permanganate solution (1.73N) was added to the sodium formate solution, and the resulting mixture was stirred for approximately an additional 10 minutes at a temperature between 25° and 100° C. to produce manganese oxide sols according to Reaction (1) above.

The carbon slurry was then prepared by placing 500 grams of distilled water in a tank, adding 7 grams of Black Pearls 2000, and 93 grams of Norit SX1G, and stirring the mixture for 15 minutes. The manganese oxide sols were poured into a tank containing the carbon slurry, and the suspension was stirred for approximately an hour. A waterproofing agent, and in particular 25 grams of Teflon T-30, was added to the suspension and the resulting mixture is stirred for approximately 10 minutes.

The resulting cathode mixture was then treated to provide a cathode. In particular, the mixture was filtrated on Buchner funnel, and rinsed with $H_2O$ before being dried at 90° C. for approximately 14 hours. Finally, it was rolled to provide the catalyst active layer. The catalyst layer was then laminated and treated in the manner described above, and its performance was measured and compared to conventional cells, as will now be described.

RESULTS

To illustrate the catalytic performance of the air cathode fabricated in accordance with the preferred embodiment, polarization curves of carbon based air cathode loaded with or without manganese oxide of this invention were determined in concentrated alkaline electrolyte at room temperature. Polarization measurements were carried out in a single compartment cell with three-electrode configuration using Solatron 1286 with CorrWare for Windows. The electrode potential was measured and referred to zinc wire while the counter electrode was gold plated nickel gauze. Long-term performance tests of carbon based air cathode were conducting at constant current density over a period of time and recording the corresponding changes in electrode potential.

Figure 3:
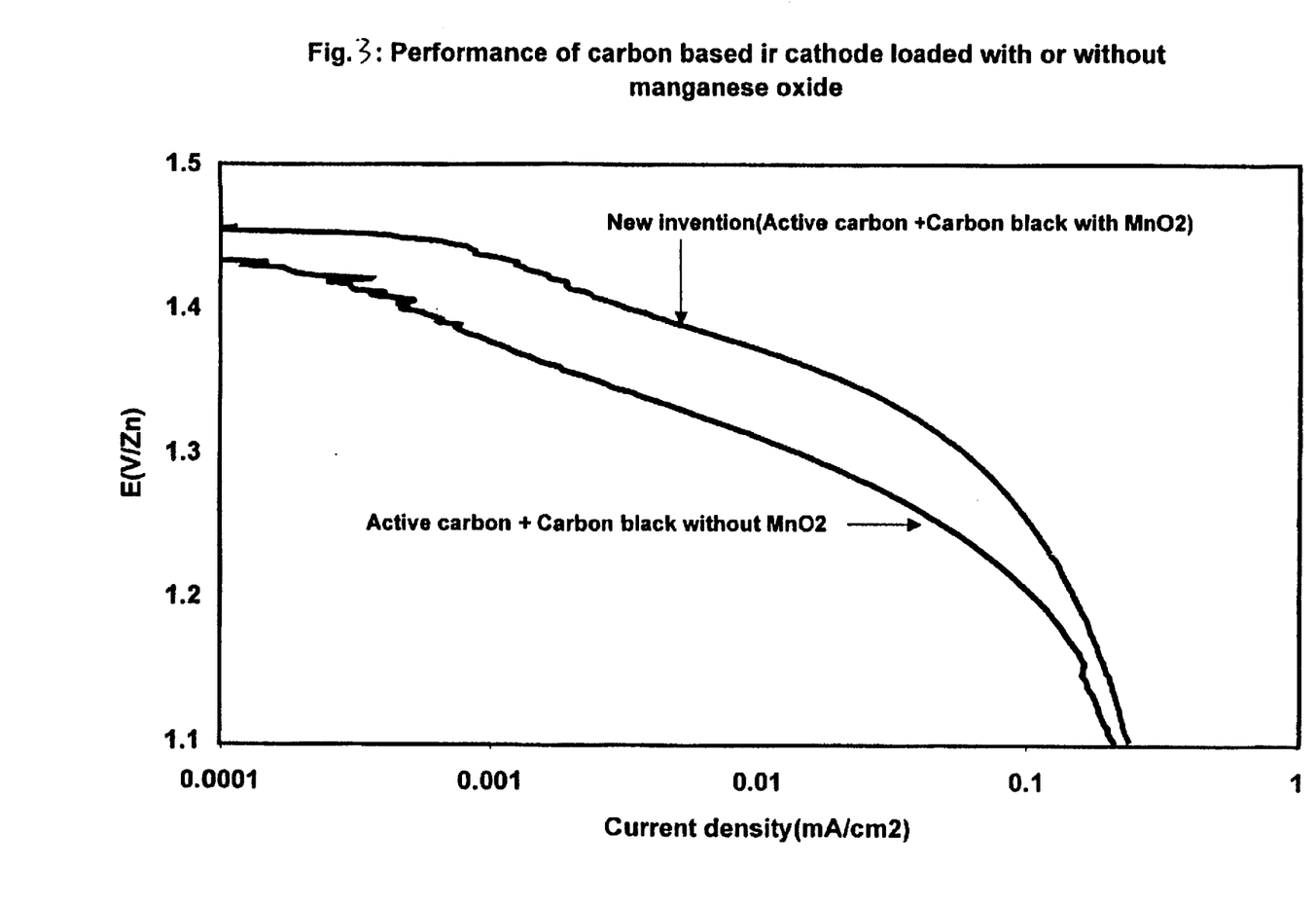
FIG. 3 is a graph illustrating the performance of a cathode constructed in accordance with the present invention compared to cathodes prepared without manganese oxide.
Figure 4:
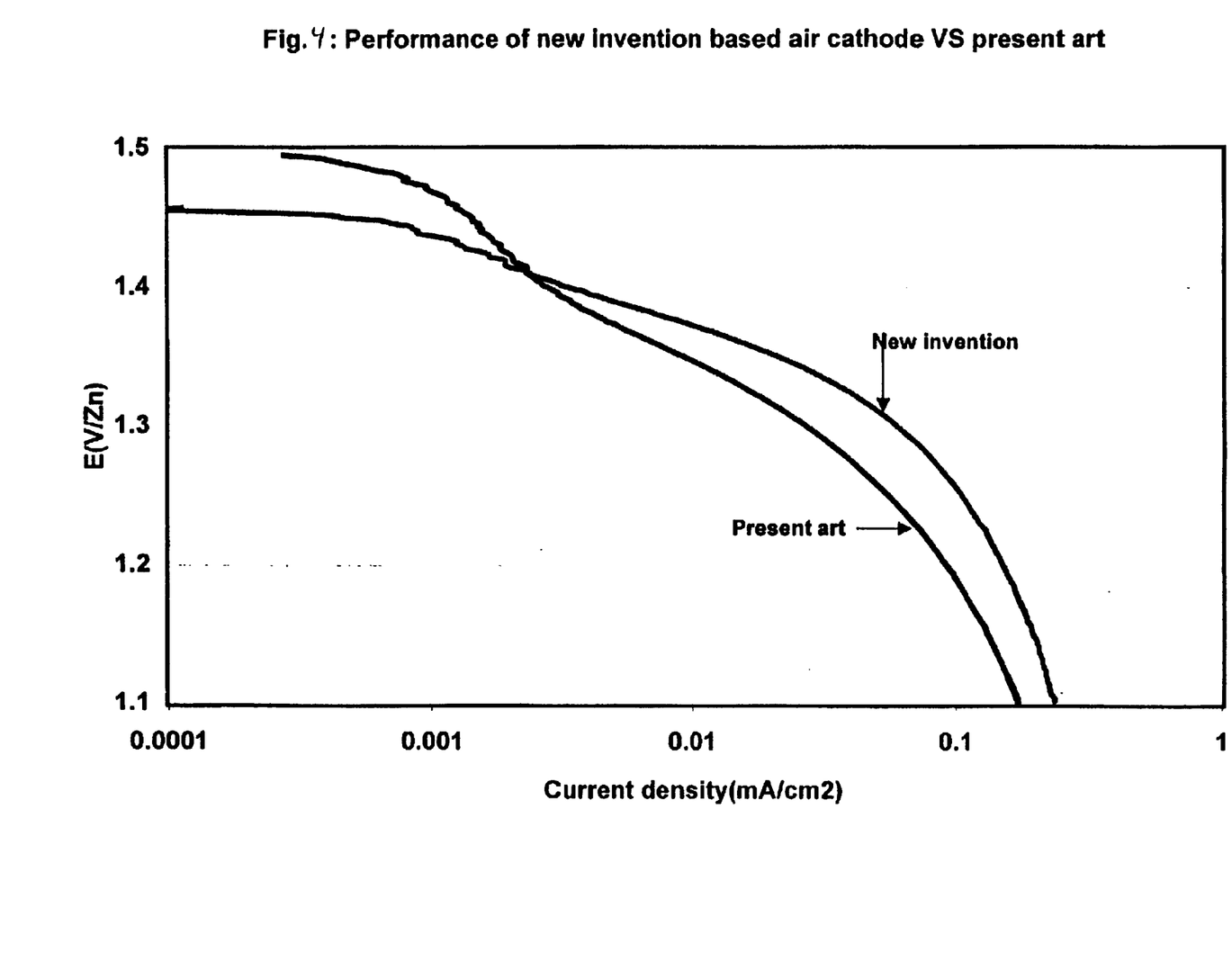
FIG. 4 is a graph comparing the performance of a manganese oxide based air cathode with a cathode constructed in accordance with the prior art.

Referring to FIG. 3, the electrochemical performance of a cathode constructed in accordance with the preferred embodiment was compared to a cathode that included actived carbon and carbon black, without manganese oxide particles. As the graph illustrates, the air cathode constructed in accordance with preferred embodiment exhibits low polarization as compared to a cathode prepared without catalyst for a given current density. It was also determined that the polarization of the cathode of the present invention was lower than that of the prior art cathode over the usable current density range as illustrated in FIG. 4. The performance of the air cathode constructed in accordance with preferred embodiment was clearly superior as compared to either prior art cathode or cathode prepared without catalyst.

Figure 6:
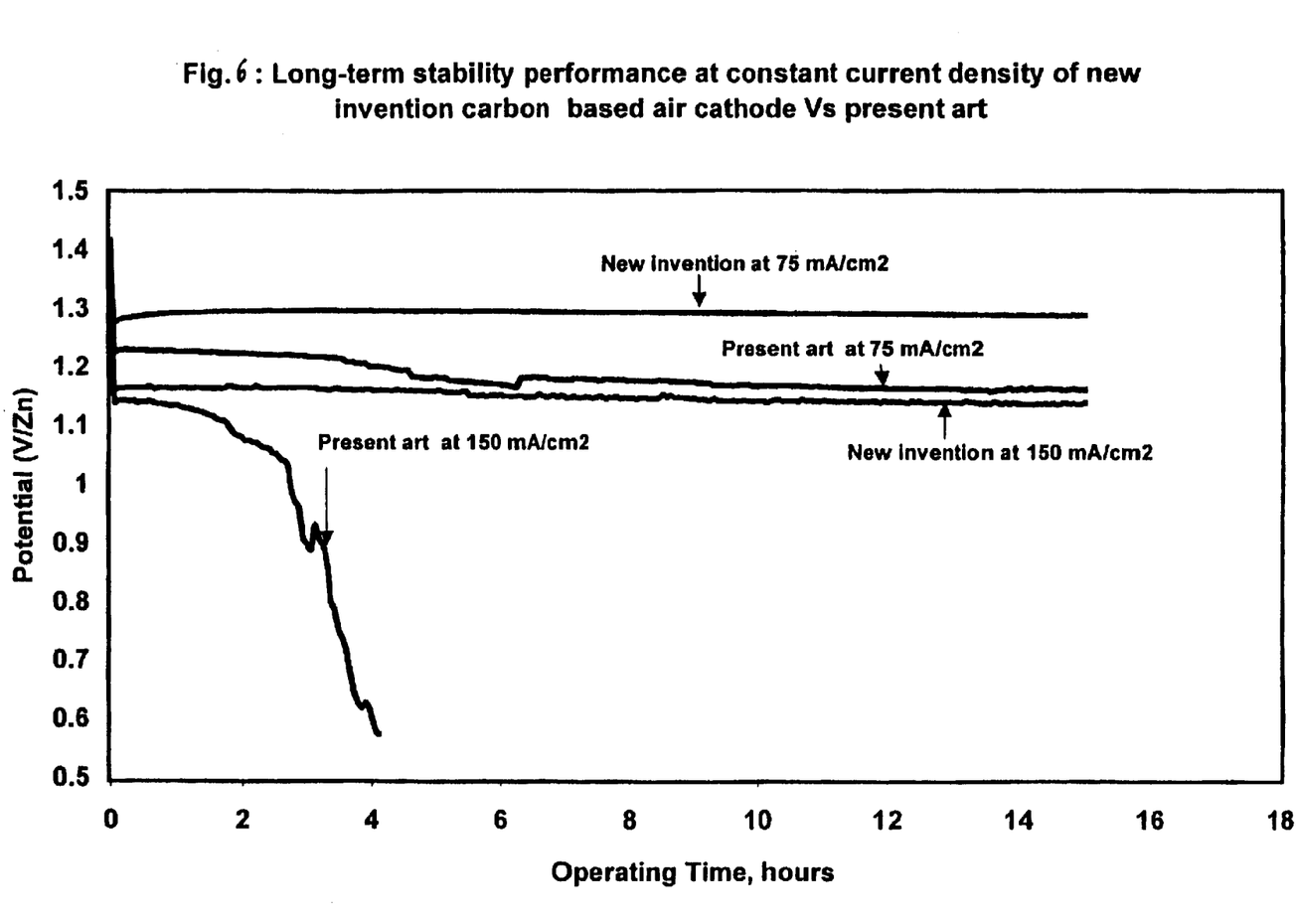
FIG. 6 illustrates the long-term stability performance of a cathode constructed in accordance with the preferred embodiments compared with that of the prior art.

Referring to FIG. 6, the long-term stability performance of conventional cathode and cathodes constructed in accordance with the preferred embodiment was gauged by the potential of the cathode at a given current density over a prolonged period of time. As illustrated, the cathode constructed in accordance with the preferred embodiment has improved long-term stability performance over prior art cathodes. For example, the present cathode exhibits greater potential stability than the prior art at a current density of 75 mA/cm$^2$. Moreover, at a higher current density of 150 mA/cm$^2$, the present cathode outlasts the prior art by approximately 10 hours, and sustains a significantly higher potential.

Figure 7:
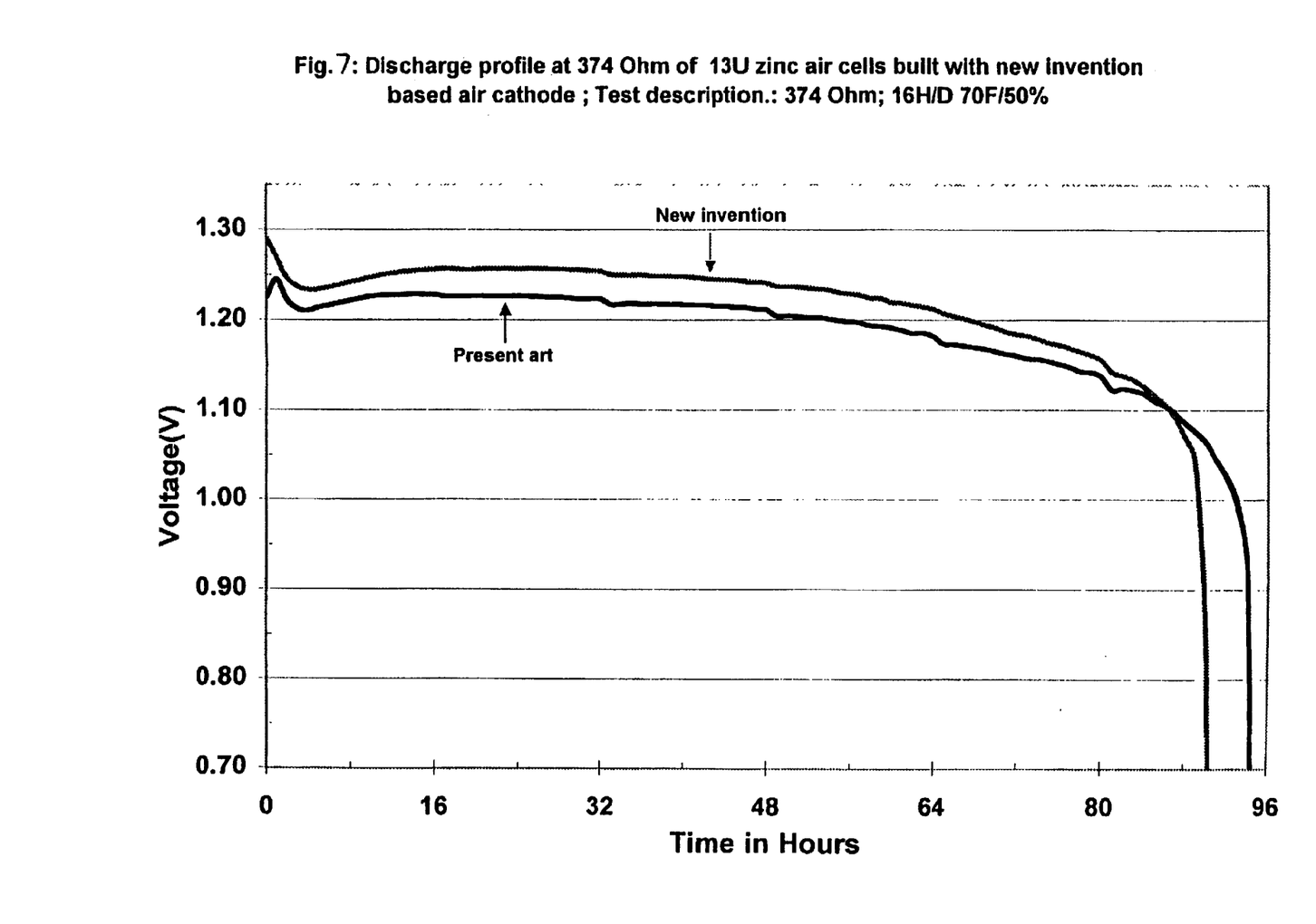
FIG. 7 is a graph illustrating the discharge profile of a zinc air 13 size cell constructed in accordance with the preferred embodiment compared to the prior art.

It has further been determined that the present cathode produces a metal-air cell having an increased operating voltage, when compared to prior art metal-air cells. In particular, referring to FIG. 7, the discharge profile of zinc-air 13 size cells having cathodes constructed in accordance with the present invention are compared to those of the prior art. As illustrated, the present cell achieves an operating voltage of almost 30 mV greater than prior art cells throughout the usable life of the cell. While the present cell becomes fully depleted a few hours sooner than the conventional cell, a skilled artisan would appreciate that the voltage of the conventional cell is substantially low so as to render the cell useless for its intended purpose during this time.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangement included within the spirit and scope of the invention, as set forth by the appended claims.

I claim:

1. A method for producing a cathode mixture having manganese oxide particles, comprising:
   providing a first chemical compound having manganese;
   providing an organic reducing agent having a single carbon atom;
   mixing the first chemical compound with the reducing agent to yield a sol of manganese oxide particles; and
   adding the sol to a carbon slurry to produce a carbon slurry with suspended manganese oxide particles.

2. The method as recited in claim 1, wherein the first chemical compound comprises potassium permanganate.

3. The method as recited in claim 1, wherein the reducing agent comprises sodium formate.

4. The method as recited in claim 1, wherein the reducing agent is selected from the group consisting of formic acid and formaldehyde.

5. The method as recited in claim 1, wherein the mixing step is carried out approximately at a neutral pH level.

6. The method as recited in claim 1, wherein the sol contains manganese dioxide particles.

7. The method as recited in claim 1, wherein the carbon slurry comprises a mixture of activated carbon and carbon black.

8. The method as recited in claim 7, wherein the activated carbon and carbon black have a BET surface area of approximately 900 m$^2$/g and 1500 m$^2$/g, respectively.

9. The method as recited in claim 1, wherein a plurality of the manganese oxide particles have a size between 20 to 26 micrometers.

10. A method for producing a cathode having manganese oxide particles, comprising:
    providing a first chemical compound having manganese;
    providing an organic reducing agent having a single carbon atom;
    mixing the first chemical compound with the reducing agent to yield a sol of manganese oxide particles;
    adding the sol to a carbon slurry to produce a suspension of carbon slurry containing manganese oxide particles;
    mixing a waterproofing agent to the suspension to produce a cathode compound; and
    drying and rolling the cathode compound.

11. The method as recited in claim 10, wherein the waterproofing agent is selected from the group consisting of polytetrafluoroethylene and polyethylene.

12. The method as recited in claim 10, further comprising laminating the cathode compound with a screen on one side and an air diffusion layer on a second side opposite the first side.

13. The method as recited in claim 12, further comprising attaching a separator to the screen.

14. The method as recited in claim 10, further comprising installing the cathode in a metal-air cell.

15. The method as recited in claim 14, wherein the metal-air cell is a zinc-air cell.

16. The method as recited in claim 14, wherein the metal air-cell is a button cell.

17. A method for producing a cathode mixture having manganese oxide particles, comprising:
    providing a first chemical compound having manganese;
    providing an organic reducing agent;
    mixing the first chemical compound with the reducing agent to yield a sol of manganese oxide particles; and
    adding the manganese oxide particles to a carbon slurry to produce a suspension of carbon slurry with suspended manganese oxide particles.

18. The method as recited in claim 17, wherein the reducing agent is organic having a single carbon atom.

* * * * *